United States Patent
Hui et al.

(10) Patent No.: US 9,453,418 B2
(45) Date of Patent: Sep. 27, 2016

(54) HOLLOW AIRFOIL WITH COMPOSITE COVER AND FOAM FILLER

(71) Applicant: United Technologies Corporation, Hartford, CT (US)

(72) Inventors: Kwan Hui, Manchester, CT (US); Michael A. Weisse, Tolland, CT (US); Darin S. Lussier, Berlin, CT (US); Hillary Anne Huttenhower, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 898 days.

(21) Appl. No.: 13/716,930

(22) Filed: Dec. 17, 2012

(65) Prior Publication Data
US 2014/0170435 A1    Jun. 19, 2014

(51) Int. Cl.
*F01D 5/14* (2006.01)
*F01D 5/28* (2006.01)

(52) U.S. Cl.
CPC ............... *F01D 5/147* (2013.01); *F01D 5/282* (2013.01); *F05D 2300/612* (2013.01); *Y02T 50/672* (2013.01); *Y02T 50/673* (2013.01); *Y10T 156/1002* (2015.01); *Y10T 428/12479* (2015.01); *Y10T 428/13* (2015.01); *Y10T 428/1366* (2015.01); *Y10T 428/1376* (2015.01)

(58) Field of Classification Search
CPC .................. F01D 5/147; F01D 5/282
See application file for complete search history.

(56) References Cited

U.S. PATENT DOCUMENTS

| | | | |
|---|---|---|---|
| 3,695,778 A * | 10/1972 | Taylor | F01D 5/147 416/233 |
| 5,725,355 A | 3/1998 | Crall et al. | |
| 5,947,688 A | 9/1999 | Schilling et al. | |
| 6,033,186 A | 3/2000 | Schilling et al. | |
| 6,039,542 A | 3/2000 | Schilling et al. | |
| 6,364,616 B1 | 4/2002 | Stevenson et al. | |
| 6,669,447 B2 | 12/2003 | Norris et al. | |
| 6,884,507 B2 * | 4/2005 | Lin | C08G 18/10 428/402.21 |
| 7,189,064 B2 * | 3/2007 | Helder | B23K 20/122 416/232 |
| 7,458,780 B2 | 12/2008 | Weisse et al. | |
| 7,993,105 B2 | 8/2011 | Weisse et al. | |

(Continued)

FOREIGN PATENT DOCUMENTS

EP       0786580 A2    7/1997

OTHER PUBLICATIONS

International Search Report and Written Opinion, dated Mar. 26, 2014, for PCT Application No. PCT/US2013/072995, 13 pages.

(Continued)

*Primary Examiner* — Craig Kim
*Assistant Examiner* — Jason Fountain
(74) *Attorney, Agent, or Firm* — Kinney & Lange, P.A.

(57) ABSTRACT

A hollow article includes a metallic hollow article formed from a having a first major surface, an internal cavity with an opening in the first major surface, and a socket around the opening; a cover of composite material received in the socket and covering the opening; and a filler material of foam in the internal cavity.

17 Claims, 4 Drawing Sheets

(56) References Cited

U.S. PATENT DOCUMENTS

| | | | |
|---|---|---|---|
| 8,177,513 B2* | 5/2012 | Shim | B23P 15/04 29/889.7 |
| 2003/0069321 A1 | 4/2003 | Lin et al. | |
| 2005/0254955 A1 | 11/2005 | Helder et al. | |
| 2010/0209235 A1 | 8/2010 | Shim et al. | |
| 2010/0266415 A1* | 10/2010 | Viens | F01D 5/147 416/226 |
| 2011/0211965 A1* | 9/2011 | Deal | F01D 5/147 416/223 R |
| 2011/0211967 A1* | 9/2011 | Deal | F01D 5/147 416/224 |

OTHER PUBLICATIONS

The European Search Report mailed Nov. 13, 2015 for European Application No. 13865219.3.

* cited by examiner

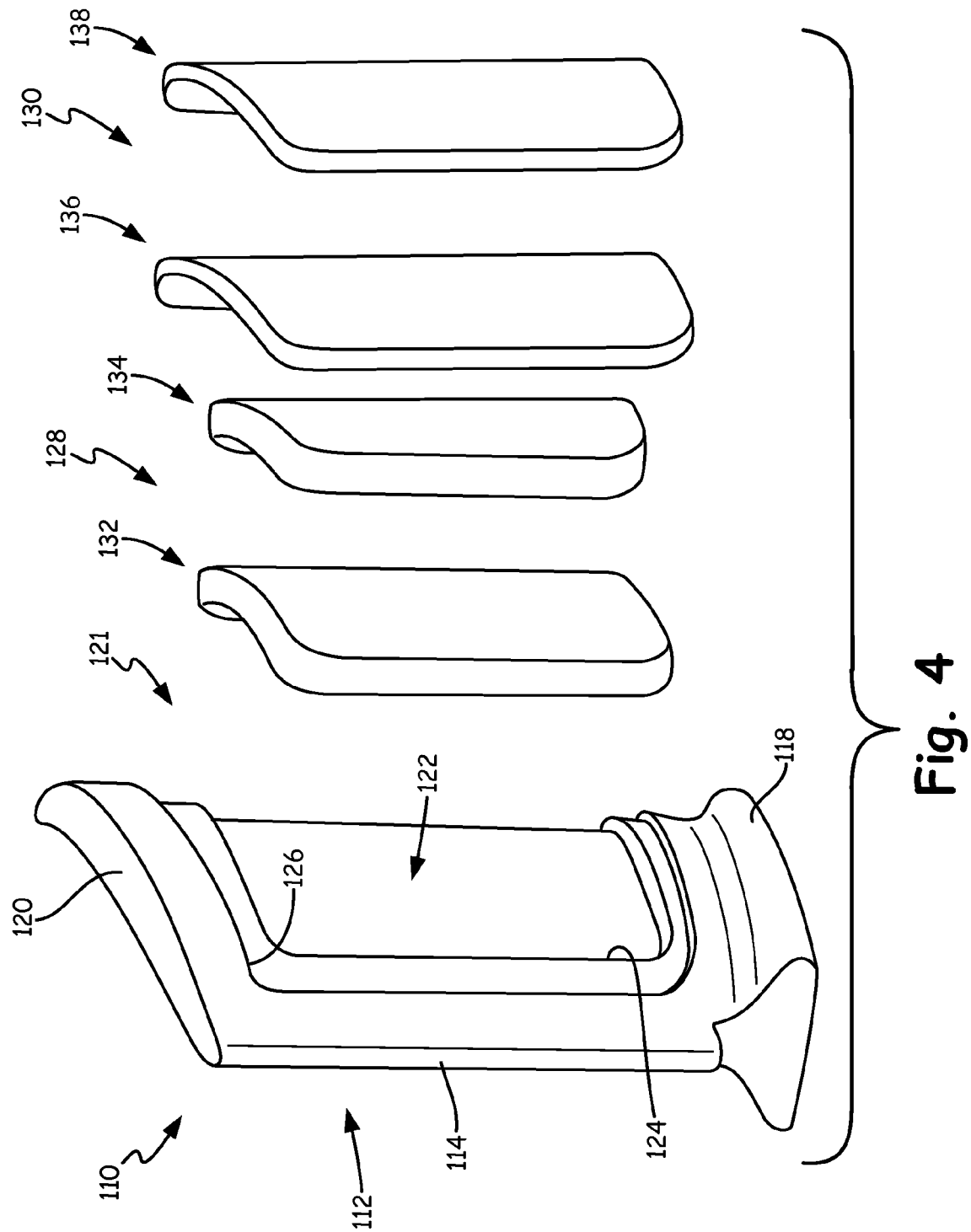

HOLLOW AIRFOIL WITH COMPOSITE COVER AND FOAM FILLER

BACKGROUND

Titanium alloys and fiber composites are the benchmark classes of materials for fan and compressor blades in commercial airline engines. One reason for the materials being so broadly adopted is that regulations require an engine in commercial service to be capable of ingesting a medium-sized bird while allowing for continued operation or safe and orderly shutdown of that engine. Another reason is that the blades must resist cracking from nicks and dents caused by small debris such as sand and rain. Engines with titanium fan blades or certain reinforced fiber composite fan blades are the only ones that currently meet these criteria.

While titanium blades are relatively strong and light in weight, composite blades offer sufficient strength and a significant weight savings over titanium. However, composite blades do not scale well to smaller engine applications and the costs are several times those of already expensive titanium blades. Both titanium and fiber composite raw materials are also expensive to process. These blades often require expensive specialized equipment to process the material into an aerodynamic shape that maintains strength while keeping weight to a minimum. Further, due to their relatively low strain tolerance, composite blades require a greater thickness than otherwise equivalent metal blades to meet bird strike requirements. Greater blade thickness reduces fan efficiency and offsets a significant portion of weight savings from using composite materials.

Both solid and hollow blades made from titanium or titanium alloys, such as Ti-6Al-4V alloys, have been proven to offer sufficient hardness to resist erosion and foreign object damage and be certified for commercial service. However, diminishing returns are seen with these hollow blades as the cavities become smaller and approach the required thickness of the airfoil surfaces. Further, hollow blades are costly to produce using current techniques, particularly in the case of titanium, where expensive processes such as diffusion bonding are usually necessary to join two sheets together into a single hollow structure. Other less costly processes do not reliably produce the desired results without introducing unwanted stresses or weakening the blade in key areas.

SUMMARY

A hollow article includes a metallic hollow article formed from a having a first major surface, an internal cavity with an opening in the first major surface, and a socket around the opening; a cover of composite material received in the socket and covering the opening; and a filler material of foam in the internal cavity.

A method for making a hollow article includes forming a hollow article from a metallic material; forming an opening, a socket, and at least one cavity in a first major surface of the hollow article; filling the at least one cavity with foam material; forming a composite cover sized and shaped to cover the opening; and adhesively bonding cover to the socket and filler material.

BRIEF DESCRIPTION OF THE DRAWINGS

FIG. 4 illustrates a second embodiment of an exploded hollow blade.

DETAILED DESCRIPTION

Figure 1:
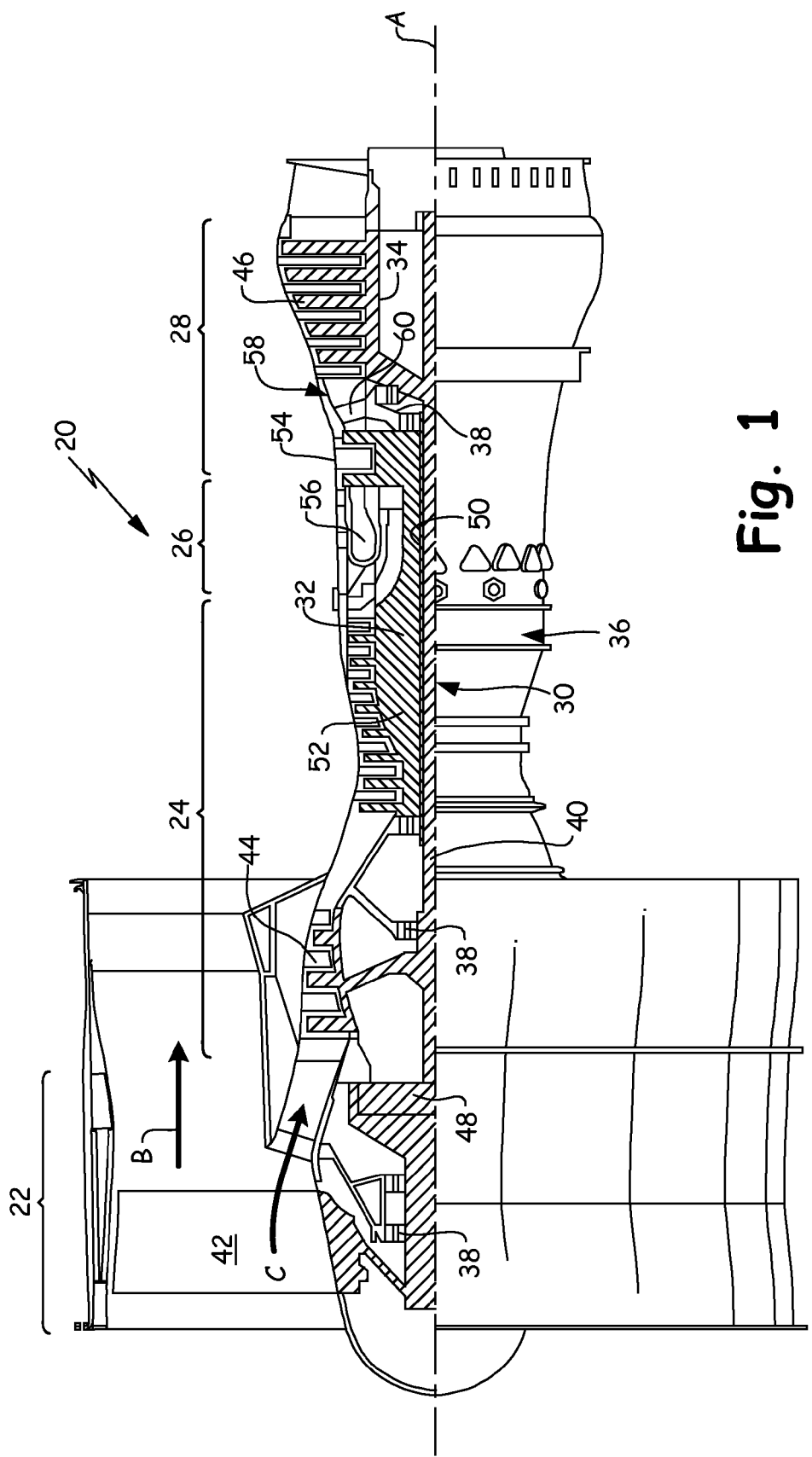
FIG. 1 schematically illustrates an example gas turbine engine that includes a fan section, a compressor section, a combustor section and a turbine section.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ ^\circ R)/518.7]^{0.5}$. The "Low corrected fan tip speed", as disclosed herein according to one non-limiting embodiment, is less than about 1150 ft/second.

The example gas turbine engine includes fan 42 that comprises in one non-limiting embodiment less than about twenty-six fan blades. In another non-limiting embodiment, fan section 22 includes less than about twenty fan blades. Moreover, in one disclosed embodiment low pressure turbine 46 includes no more than about six turbine rotors schematically indicated at 34. In another non-limiting example embodiment low pressure turbine 46 includes about three turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

In a turbofan engine, lighter components generally lead to more efficient performance. If less energy is expended moving internal engine parts, more energy is available for useful work. At the same time, the components themselves must be strong enough to withstand forces typical for the operating environment and performance envelope. Safety considerations based on the frequency and/or severity of possible failure will often dictate that the engine components also be able to withstand certain atypical, yet foreseeable events as well. Because stronger components are often heavier and/or more expensive, a balance must be struck between efficiency, safety, and cost.

Few locations in an aircraft are more representative of efforts to optimize the balance between efficiency, safety, and cost than engine 20. While lighter materials are preferable to improve efficiency, the high risk of severe consequences from engine damage will require that engine 20 be made of components having additional margins of safety. Combining parts having both high strength and low density greatly restricts material choices and increases costs. Not infrequently, processing these strong and light materials including fiber composites and titanium is also complex and expensive, such as in hollow blades formed by diffusion bonding two machined plates or two forged halves together.

One alternative to diffusion bonding for creating hollow blades includes welding a cover onto a partially hollowed out airfoil. However, a welded cover has several shortcomings in complexity and reproducibility of the weld, as well as in the blade's ability to resist damage. The following figures depict hollow blades with a bonded composite cavity cover adapted for use in a turbo fan engine, such as engine 20 of FIG. 1.

Figure 2B:
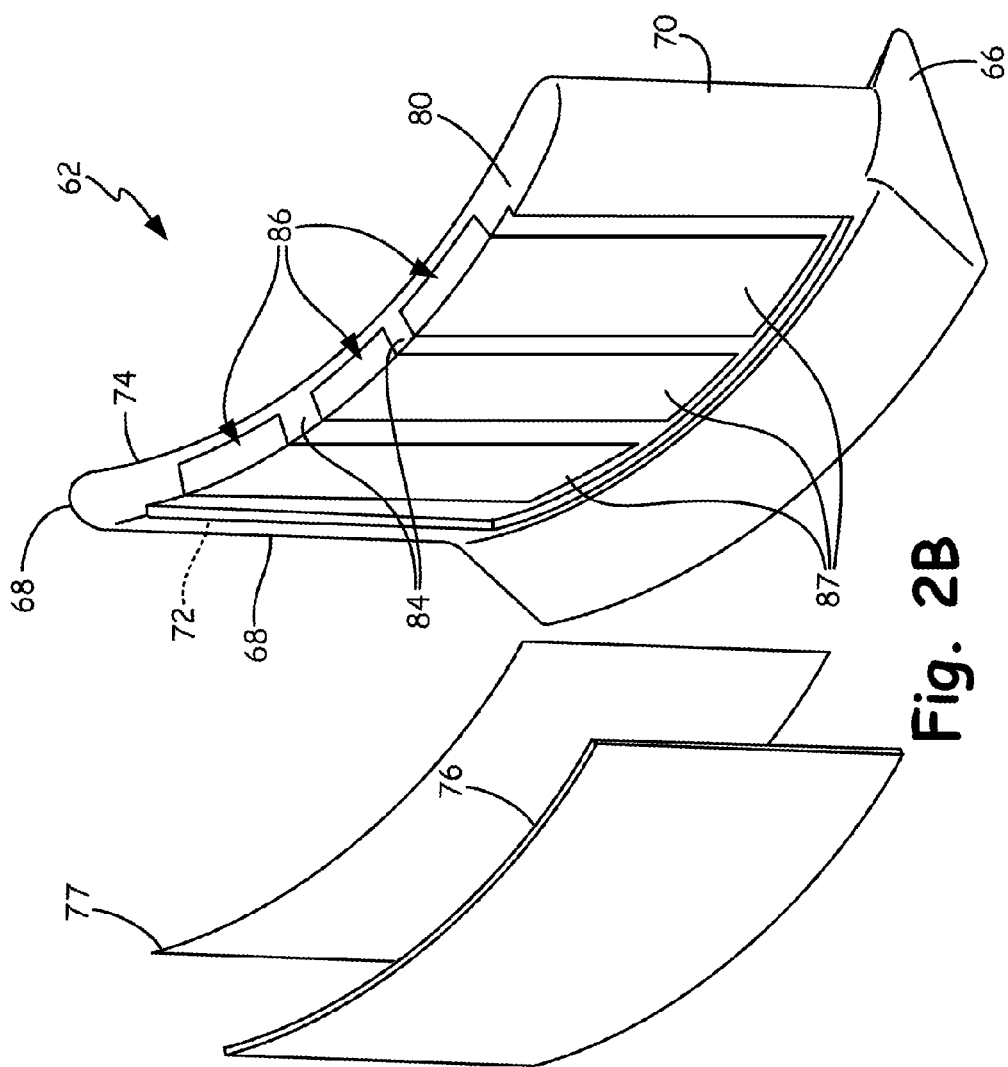
FIG. 2B is a cross-section of the hollow blade of FIG. 2A.
Figure 2A:
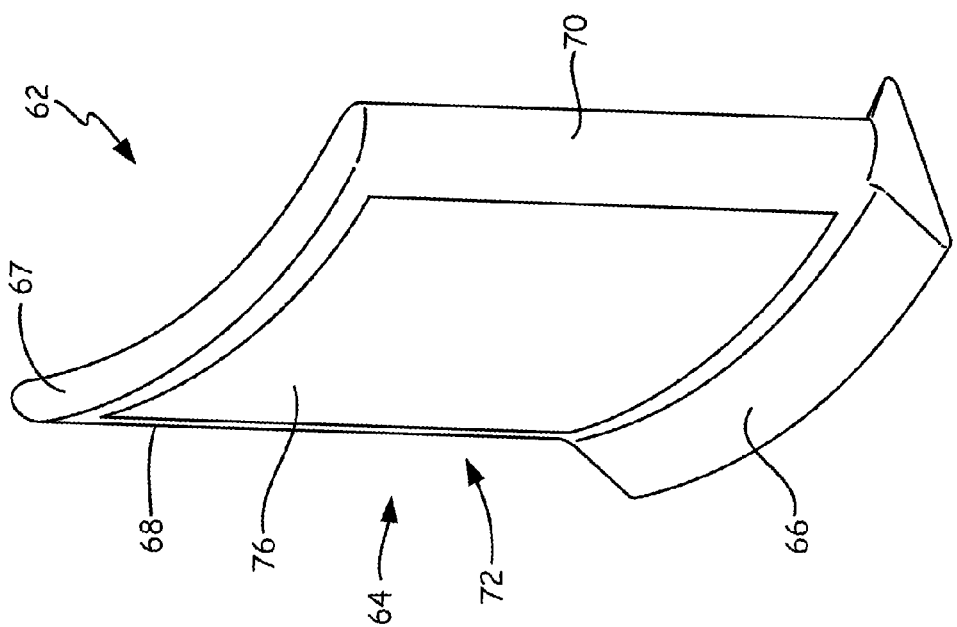
FIG. 2A is a side view of a hollow blade used in the engine of FIG. 1.

Hollow blade 62 is shown in FIG. 2A comprising airfoil 64 and root 66. FIG. 2B shows a cross-sectional view of blade 62. Blade 62 includes tip 67, leading edge 68, trailing edge 70, suction surface 72, pressure surface 74, root 66, cavity cover 76, socket 80, ribs 84, cavities 86 and filler material 87. Airfoil 64 is a hollow aerodynamic structure described in further detail below. Pressure surface 74 is a major surface opposite major suction surface 72. Cavity cover 76 is a composite material, and filler material 87 is pourable or foamed in place foam.

Blade 62 connects to a disk or rotor (not shown) in fan section 22 at root 66. Alternatively, blade 62 can have a different configuration of root, or a root can be incorporated with the disk in what is known as an integral rotor blade configuration. Leading edge 68 and trailing edge 70 extend generally spanwise in a curved manner from root 66 to tip edge 67. Air flows chordwise from leading edge 68 over major surfaces suction surface 72 and pressure surface 74, and converges at trailing edge 70.

A platform (not shown) provides an inner flow path to direct incoming air over suction surface 72 and pressure surface 74, and away from the rotor (not shown). In FIG. 2A, a platform (not shown) may be integrated with airfoil 64. A platform may also be fabricated and attached separately to airfoil 64 or attached directly to the rotor.

Blade 62 also includes cavity cover 76 and socket 80 on suction surface 72. Socket 80 is represented by the dashed line on suction surface 72. Cavity cover 76 engages with socket 80, covering an opening and completing a continuous first surface of airfoil 64. Here, the first surface is suction surface 72. Socket 80 is disposed around an opening in suction surface 72 leading to cavities 86, located within the interior volume of airfoil 64. Cover 76, socket 80, and cavities 86 are described in more detail below.

Cavities 86 are located between suction surface 72 and pressure surface 74. Support ribs 84 are disposed between cavities 86. Filler material 87 is disposed within cavities 86, typically between ribs 84. Adhesive bonds cover 76 to airfoil 64. When adhesive 64 is placed and cured between cover 76 and airfoil 64, cover 76 permanently covers the opening surrounded by socket 80, and encloses cavities 86, ribs 84 and filler material 87.

Cavities 86 are hollow sections of blade 62 located within airfoil 64 between the two major surfaces, suction surface 72 and pressure surface 74. Specific dimensions and alignment of cavities 86 and ribs 84 within blade 62 can vary depending on blade requirements. Regardless of size or alignment, one method of forming cavities 86, is to remove material (e.g., by machining) from a major surface of airfoil 64, like suction surface 72.

An opening provides access to cavities 86 and occupies a given surface area on suction surface 72. Around the perimeter of this opening, socket 80 is formed, again, for example, by machining. Socket 80 engages and structurally supports cover 76, so that cavities 86 are enclosed on all sides. Socket 80 can be defined by a variety of surfaces extending around the opening, including, for example, one or more lips, ridges, notches, or other engagement surfaces. Alternatively, socket 80 is merely an indentation in blade 62 to allow cover 76 to sit flush with suction surface 72 or pressure surface 74 with no engagement between the two except for the adhesive.

Cover 76, is made of composite material and can be comprised of a plurality of covers 76, for example fiberglass plies and epoxy. Cover 76 is curved, with a substantially uniform thickness over its chordwise dimension. The curvature of cover 76, is shaped to form a substantial portions of suction surface 72. The thickness of cover 76 is sized to withstand anticipated vibratory stresses and potential foreign object damage.

Filler material 87 is a foam material, which can be foamed in place in the cavity 86. Filler material 87 can be metallic or nonmetallic. Filler material 87 adds additional strength to airfoil 64 by mitigating or eliminating cover 76 distortion as blade 62 vibrates. It also mitigates risk of cover 76 disbonding from blade 62 by increasing adhesive area for cover 76. Filler material 87 reinforces composite cover 76, allowing cover 76 to be thin and lightweight while still able to withstand potential foreign object damage. Filler material 87 is also easy to insert into cavity 86, as it can be simply foamed in cavity 86, taking on shape of cavity 86.

In some embodiments, cover 76 has a thickness in the main portion between about 0.020 inches (about 0.508 mm) and about 0.156 inches (about 3.962 mm). Alternatively, cover can be made with varying thicknesses across the chordwise dimension.

Loads of varying magnitude and direction are distributed throughout blade 62 during operation of engine 20, particularly over pressure surface 72. Small foreign object impacts occur on this surface as well as continuous vibratory stresses from high pressure airflow. Cover 76 can withstand many of these forces by transmitting them through socket 80, into the body of blade 62. However, in the event of a bird strike proximate suction surface 72, cover 76 and socket 80 experience a great amount of shear.

With a welded cover, these forces are transmitted from the cover through the weld bead to the blade. While the weld bead is typically stronger than the materials it is joining, welding has several shortcomings. Many conventional welding processes produce excess heat, causing thermal distortion in the surrounding metal. The excess heat plastically deforms the metal beyond the targeted area and weakens the microstructure surrounding the bead. Welding also generates high mechanical stresses and introduces defects into the blade even in advanced welding processes with better heat control like fusion welding. These mechanical stresses can cause permanent deformation of blades, as well as potentially any surrounding ribs or filler. The areas adjacent to the weld bead are prone to crack initiation unless the depth of the bead matches the thickness of the cavity cover over the entire blade.

In contrast, adhesive bonding of composite cover 76 to socket 80 avoids the heat and mechanical stresses inherent in welding. Unlike welding, adhesive does not require heat or mechanical stress beyond that needed for curing, which in many embodiments will not exceed about 400° F. (204° C.) and about 150 psi (1.0 MPa). Also, welding affects the microstructure of ribs 84 if done too close, whereas adhesive bonding does not, allowing ribs 84 to extend through the entire volume of cavities 86. Further, welding also has its bonding area limited to the regions immediately surrounding socket 80. In addition, a weld bead does not provide force damping for vibratory stresses and foreign object impacts between cover 76 and airfoil 64.

When a relatively large foreign object strikes hollow blade 62 proximate composite cover 76, forces are transmitted through socket 80 and adhesive. In addition to foreign objects, blade 62 experiences significant vibratory stresses from the passing air and from operation of the surrounding engine components. If the total bonding area on socket 80 is not large enough to sufficiently spread and withstand these lateral forces and vibratory stresses, the bond may fail. Increasing the amount of available bonding area within cavities 86 by including ribs 84 (and filler material 87) for bonding composite cover 76 to can increase bonding area, which helps socket 80 resist shear forces.

By adhesively bonding composite cover 76 to ribs 84 in addition to socket 80, the risk of failure due to a foreign object strike or operational fatigue proximate the bonding area is reduced. Ribs 84 are formed on the cavity side of pressure surface 74 and extend through cavities 86 ending approximately at the cavity side of cover 76. Since cover 76 forms a substantial portion of suction surface 72, the cavity side of cover 76 rests on ribs 84 in addition to socket 80, thus providing additional bonding surfaces for cover 76.

Ribs 84 are shown for illustration and ease of description in FIG. 2B as substantially parallel and equidistant structures, but can take any form throughout cavities within blade 62. Different types of hollow blades typically contain a plurality of ribs 84 within one or more cavities. Ribs 84 reinforce suction surface 72 and pressure surface 74, including cavity cover 76. Reinforcement allows these surfaces as well as overall airfoil 64 of blade 62 to be thinner, thus saving weight. The particular design of ribs 84 will be dependent on several factors but will typically be directed toward balancing weight reduction and raw material savings with processing costs.

Adhesive also bonds composite cover 76 to foam filler material 87. Filler material 87 may be foamed in place in cavity 86, provides structural support to suction surface 72 and/or pressure surface 74 and offers additional bonding area for cover 76. In some embodiments, foam 87 may also be foamed outside of the cavity, then machined into the cavity's shape, rather than foamed in place. Foam can be metallic or nonmetallic. Examples of suitable filler material 87 include polyurethane modified polyisocyanurate pour foam and structural foam such as rohacell. Filler 87 is disposed within cavities 86 to fill gaps between adjacent ribs 84. As filler 87 is foam, it may be allowed to foam in place in cavity 86 to reinforce all areas surrounding hollow cavities 86. Filler material 87 in some embodiments also provides force damping as described below.

Filler material 87 allows for a greater quantity of adhesive to be used overall in bonding cover 76 because of the additional surface area for bonding. This larger bonding area spreads out the area over which force is transmitted between cover 76 and the remainder of blade 62, reducing the risk that the bonds will fail. Foam also provides light-weight reinforcement of cover 76, allowing cover 76 to be made thinner, saving weight.

In alternative embodiments, there are no ribs 84, or ribs 84 do not extend through the entire depth of cavities 86. In these embodiments, cover 76 can be bonded solely to socket 80 and foam filler material 87. Adhesive used is one that is suitable for bonding composite cover 76 to metallic socket 80, ribs 84 and filler material 87 in aviation applications. Several epoxy- and urethane-based adhesives are commercially available and are suitable for bonding. The adhesives can be supported by scrim 77.

Filler material 87 can also provide dampening for blade 62. Force damping is generally desirable in hollow blades 62 because damping increases the time over which airfoil 64 absorbs and responds to impacts and vibratory stresses, decreasing likelihood of damage or failure. The dampening increases the incipient flutter margin for blade 62 allowing an increase in angle of attack.

The additional bonding strength and reinforcement provided by foam filler 87 achieves additional weight reduction by replacing some of the solid metal otherwise needed in blade 62 with light-weight composite cover 76 and light-weight foam filler 87. The number or size of metallic ribs 84 can be limited, as well as the thickness of major surfaces, pressure surface 74, and as well as suction surface 72. Therefore, bonding cover 76 to foam filler 87 and ribs 84 offers a potential overall weight savings despite the added weight of filler material 87.

Figure 3:
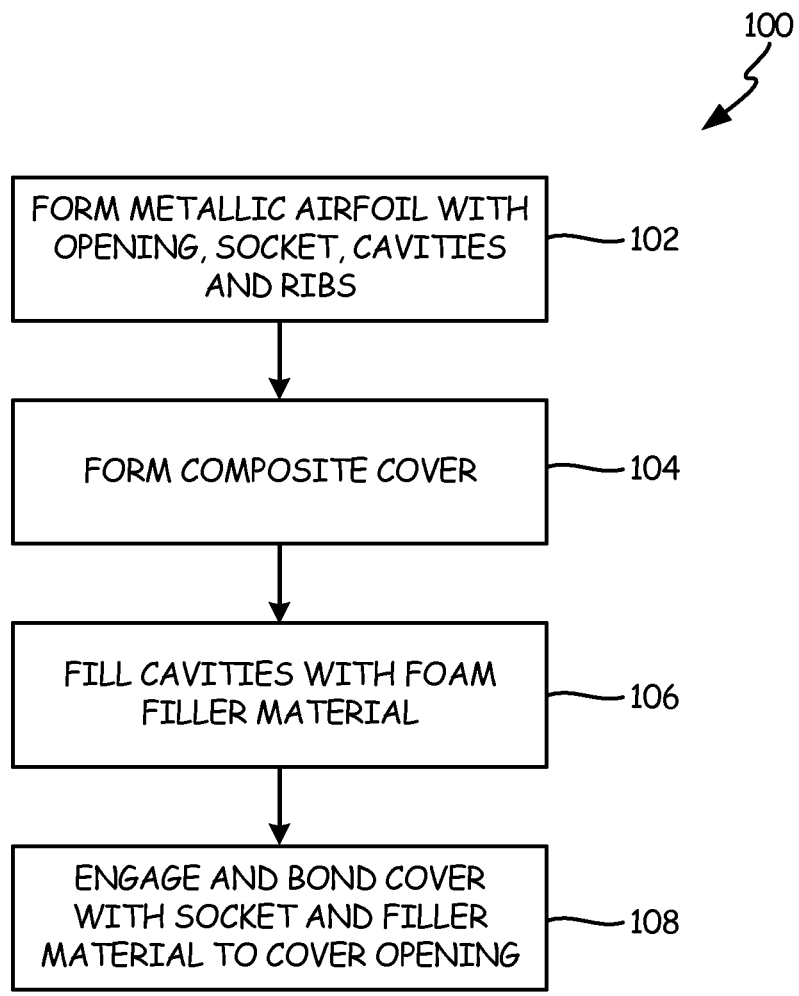
FIG. 3 is a flowchart detailing the steps for making the airfoil of FIG. 2A.

FIG. 3 is a flowchart depicting the above-described steps to make blade 62 as shown in FIGS. 2A-2B. Method 100 comprises four steps 102, 104 106 and 108. Step 102 involves forming airfoil 64 with opening, socket 80, cavities 86 and ribs 84. Step 104 involves forming composite cover 76. Step 106 involves filling cavities. Step 108 involves engaging and bonding cover 76 with socket 80 and filler material 87 to cover opening.

Hollow titanium blades 62 have frequently been made using a diffusion bonding process where two titanium sheets are superplastically joined at leading edge 68 and trailing edge 70 as well as at root 66 and tip edge 67. This process was originally adapted to create a uniform microstructure so as to reduce stress concentrators, grain boundaries, weak points, and brittleness at material junctions otherwise caused by typical welding or casting processes. However, diffusion bonding is expensive and complex compared to more conventional techniques. Further, it is unsuitable for many types of blades 62, such as where airfoil 64 is formed from an aluminum or other lightweight alloy having low phase transition temperatures.

Hollow blade 62 can be conventionally processed according to method 100 while minimizing stress concentrators and brittleness throughout blade 62. Step 102 includes the step of forming a metallic for airfoil 64 with an opening, socket 80, cavities 86 and ribs 84. Alternatively, step 102 includes the step of forming a metallic for airfoil 64, with socket 80, cavities 86 and ribs 84 machined in afterward. One example method of forming airfoil 64 includes forging. Forging is a relatively inexpensive process where a metal workpiece is heated and placed between two or more dies to form the desired shape. For example, a blank can be placed in a closed compression die causing the metal to flow into the general desired shape of airfoil 64. Forming socket 80, cavities 86 and support ribs 84 can involve forming an opening on suction surface 72. Material is then removed from the interior of blade 62 between suction surface 72 and pressure surface 74, defining cavity 86. This can be done, for example, by machining. Complementary structures between socket 80 and cover 76 are formed if necessary and/or desired.

Internal support ribs 84 are formed, for example, as an integral part of blade 62 and cavity 86. This is done by removing material (e.g., by machining) from airfoil portion 32 in cavity 86. Machining of ribs 84 can be done by a milling machine performing a series of separated plunge cuts when forming cavity 86, leaving behind ribs 84. As noted above, ribs 84 need not be substantially parallel, but rather are arranged in any pattern designed to provide structural support and desired reinforcement within cavity 86 based on anticipated operating conditions. As in the above example, ribs 84 can be machined from airfoil 64 during formation of cavity 86. Alternatively, they are formed separately and bonded within cavity 86. Ribs 84 are not limited to being formed entirely within cavity 86. Machining of socket 80, cavities 86 and ribs 84 can be done on airfoil 64 by a single piece of milling equipment. In many embodiments, a standard computer-controlled, five-axis milling machine is adequate to produce these elements in blade 62.

Steps 104 includes forming cover 76 from composite materials. This could be done using a variety of materials and methods. For example, cover 76 could be made of epoxy and fiberglass and could be made from eight lay up plies or could comprise an inner cover and an outer cover, as shown in FIG. 4. Cover 76 must be sized and shaped to fit in socket 80.

Step 106 involves filling cavities with filler material 87. Filler material 87 can be a variety of foam materials as discussed above in relation to FIGS. 2A-2B. To fill cavities, some types of foam may be inserted into cavities 86 formed in the airfoil and allowed to foam in place. This makes for a more simple and efficient manufacturing process than past systems.

Step 108 includes engaging and bonding cover 76 with socket 80. This can include various steps to preparing surfaces for bonding as well, including texturing and cleaning bonding area for improved bonding ability. Socket 80 is adapted to engage with cover 76. Bonding can be done by any suitable means, but several epoxy and polyurethane adhesives are sufficient as described above.

Final processing of blade 62 once cover 76 has been integrated into blade 62 during step 108 can then take place. Final processing can involve applying more adhesive (for example, epoxy or urethane) around the cover 76 and then sanding it down to provide a smooth surface for aerodynamic performance.

Machining airfoil 64 and cover 76 substantially into their final shapes prior to bonding can eliminate the usual twisting of blade 62 under elevated temperatures to impart a final airfoil shape to blade 62. Excessive heating and twisting of blade 62 can cause adhesive to fail and cover 76 to be ejected. If these components are formed nearly into their final shapes and bonding is successful, only final machining is required. In certain embodiments, the components are machined prior to bonding such that major surfaces of blade 62 have minimal elevation changes and gaps, making finish machining unnecessary.

The application of corrosion and erosion resistant coatings to the airfoil surfaces also assists in smoothing any gaps or evening out undesired elevation changes. Addition of such coatings to airfoil 64 and/or cover 76 also helps to reduce damage otherwise caused by continuous bombardment of blade 62 with sand, rain, and small runway debris. Erosion resistant coatings can prevent these and other small foreign objects from reaching the metal surfaces of airfoil 64, hindering formation of small nicks and dings. Corrosion resistant coatings prevent the spread of oxidation outside of areas that have been damaged despite other protective measures.

A combination of forging, machining, and adhesive bonding, significantly reduces processing time and costs of blades 62. The machining can be integrated in virtually any factory currently equipped with five-axis milling capabilities. Forging can be done on site or forged blanks can be shipped in bulk to the mill. Bonding also can take place on site, or the parts can be shipped and bonded at a separate location or the location where blades 62 will be assembled. Since this process can be adapted for virtually any hollow metal blade, implementation of this process across several product lines can significantly reduce a manufacturer's costs and increase reliability of hollow blades 62.

FIG. 4 illustrates a second embodiment of an exploded hollow blade 110. Blade 110 includes airfoil 112, lead edge 114, trailing edge 116, root 118, tip 120, suction surface 121, cavity 122, inner socket 124, outer socket 126, filler material 128 and cover 130. Filler material 128 includes a first layer of foam 132 and a second layer of foam 134. Foams 132, 134 may be a metallic foam or a non-metallic foam, and can be the same foam or different foams. Cover 130 comprises inner cover 136 and outer cover 138.

Inner socket 124 is disposed around an opening providing access to cavity 122, and outer socket 126 is disposed around inner socket 124. Cavity 122 can be formed out of a portion of the volume of previously solid airfoil 110. In the embodiment shown, cavity 122 does not include any support ribs.

Filler material 128 consists of first foam layer 132 and second foam layer 134. Other embodiments could include fewer or more materials as filler 128 and could vary filler material 128 throughout different regions of cavity 122. Cover 130 includes inner cover 136 and outer cover 138. These could be made of the same composite materials or could be formed from different composite materials. Inner cover 136 is shaped to fit into inner socket 124 and outer cover 138 is shaped to fit into outer socket 126. Inner cover 136 varies in shape from outer cover 138.

The dimensions of cavity 122 will be determined in part by the overall size of hollow blade 110. Cavity 122 occupies a percentage of the volume occupied by blade 110. For ease of comparison, this percentage includes the overall volume of blade 110 and cavity 122. The volume of blade 110 excludes root 118, and is the volume bounded by leading edge 114, trailing edge 116, suction surface 121, pressure surface, tip 120, and cover 130. The volume of cavity 122 is the total volume once enclosed by cover 130 and excluding filler material 128.

In this example, cavity 122 is located roughly at the center of the volume occupied by blade 110. In some embodiments, cavity 122 occupies between about 30-70% of the total volume of blade 110. In other embodiments, cavity 122 occupies between about 40-60% of the volume of blade 110. In yet other embodiments, cavity 122 occupies about 50% of the volume of blade 110. These percentages do not equate to total weight savings in blade 110 due to the inclusion of filler material 128, ribs (in other embodiments), and adhesive. However, the percentages represent substantial weight savings over a solid blade due to the lower density of foam filler material 128 and adhesive and the lower weight of composite cover 130 (when compared to metallic covers).

In certain embodiments, cavity cover 130 comprises between about 40%-70% of the surface area of suction surface 121. In other embodiments, cover 130 comprises between about 45%-65% of the surface area of suction surface 121. In yet other embodiments, cover 130 comprises between about 50%-60% of the surface area of suction surface 121.

It is desirable to maximize the size of cavity 122 to reduce the weight of blade 110 and improve efficiency of engine 20. However, suction surface 121 and pressure surface must be able to endure continuous operational vibratory stresses from the force of passing air. Blade 110 also experiences several other types of loading: axial loading during a foreign object impact like a bird strike, centrifugal loading during rotation, and occasional circumferential loading from contact with the engine case during strong crosswinds or after loss of a blade. Blade 110 must also be able to withstand vibratory stresses, including resonant vibrations, as well as forces that tend to untwist blade 110 from its airfoil shape. As these loads change based on different operating assumptions, the percentage of volume occupied by cavity 122 relative to the entire blade 110 will likely be adjusted to compensate.

Cover 130 comprises two sheets 136, 138 of substantially constant thickness that defines the thickness of suction surface 121. Pressure surface can also have approximately the same thickness as suction surface 121. In certain embodiments, this thickness is between about 15-35% of the maximum overall thickness of blade 110, leaving cavity 122 to occupy between about 30-70% of the overall blade thickness. In other embodiments, this thickness is between about 20-30% of the maximum overall thickness of blade 110, leaving cavity 122 to occupy between about 40-60% of the overall blade thickness. In yet other embodiments, this thickness is about 25% of the maximum overall thickness of blade 110, leaving cavity 122 to occupy between about 50% of the overall blade thickness. Suction surface 121 (primarily via cover 130) can be thicker than pressure surface or vice versa. This can be done, for example, to selectively reinforce a portion of that thicker surface against foreign object damage.

In addition to altering the thickness, the location and relative dimensions of cavity 122 can be changed to account for different risks of damage from axial loading. For example, cavity 122 can be fine-tuned in the chordwise dimension proximate leading edge 114 and trailing edge 116.

Cavity 122 has a chordwise dimension less than the overall chordwise length of blade 110. In several embodiments, this dimension of cavity 122 is between about 35-65% of an average chordwise length of blade 110. In other embodiments, this dimension of cavity 122 is between about 40-60% of an average chordwise length of blade 110. In yet other embodiments, this dimension of cavity 122 is between about 45-55% of an average chordwise length of blade 110.

This relative percentage can vary across different cross-sections in different spanwise locations of blade 110. The total chordwise length of blade 110 varies along the span of blade 110 to optimize aerodynamic performance. Thus, even a substantially constant chordwise dimension will yield a variety of relative percentages throughout cavity 122. However, the maximum chordwise dimension of cavity 122 is not always constant, which also affects these relative percentages. For example, cavity 122 can be located closer to trailing edge 116 than to leading edge 114. This is done to provide additional solid material proximate leading edge 114, due to the greater frequency of foreign object strikes compared to trailing edge 116.

In addition to axial load resistance, cavity 122 can also be optimized to reinforce blade 110 against anticipated centrifugal loads proximate a platform. A larger solid region of blade 110 proximate a platform reinforces the connection to root 130 and the central disk (not shown). One or both of the chordwise dimension and the thickness direction can be adjusted to accomplish this. In other embodiments, blade 110 instead has a greater overall thickness proximate a platform to support these centrifugal forces, and in such a case, a larger cavity generally offers sufficient support.

An embodiment where blade 110 is thicker proximate a platform includes blades 110 with an integral platform. As mentioned above, a platform can either be integral with airfoil 112, or it can be fabricated separately. An integral platform, such as in the example blade 110, makes blade 110 stronger proximate root 130 because of the greater thickness and uniformity of material in that location. This strength allows more material to be removed, enlarging that portion of cavity 122 and saving additional weight in blade 110. In some embodiments, these weight savings are offset by the added processing time and costs of more complex tooling and machining needed to produce hollow blade 110 with an integral platform. Alternatively, a separate platform simplifies tooling and machining of blade 110, including formation of cavity 122 and sockets 124, 126. Blade 110 alone is a much simpler shape to form and process than blade 110 with an integral platform, reducing manufacturing costs.

Cavity 122 can also be increased in size proximate tip edge 120 to reduce centrifugal loads at a platform. Reducing weight at the outer reaches of blade 110 translates into lower stress at root 118. While each figure depicts cavity 122 as proximate the center of blade 110, cavity 122 is not limited from extending all the way to tip edge 120. In embodiments where cavity 122 extends completely to at least a portion of tip edge 120, additional weight reduction is not only possible due to the larger size of cavity 122, this can also simplify processing of blade 110 and cover 130 by reducing the number of corners and edges. In these embodiments, cover 130 extends over that portion of tip edge 120 to enclose cavity 122 and retain filler 128. But as in all cases, the reduction in weight and simplified production must be balanced with the increased risk of foreign object damage from the lighter structure proximate tip edge 120.

Alternatively, cavity 122 can be reduced in the thickness and chordwise directions, enlarging the solid portion of blade 110 to enhance protection against a risk of damage via circumferential loading, such as from a lost blade or strong crosswinds. When engine 20 will be frequently operated in extreme weather conditions, or to provide additional assistance to the blade retention system, cavity 122 will not extend to tip edge 120. Alternatively, cavity 122 will also be made smaller in the chordwise and thickness directions, leaving more solid material and more protection proximate tip edge 120.

Relative dimensions of cavity 122 are also affected by the presence and arrangement of ribs (not present in the embodiment shown in FIG. 4). As noted above, ribs provide internal reinforcement and redirection of various external forces on blade 110. As more reinforcement is provided by ribs relative to the size of blade 110 the overall volume of cavity 122 can be increased.

As noted above, composite cover 130 and cavity 122 with filler material 128 allows for a thinner and lighter weight blade 110. The use of composite material for cover 130 and foam as filler material 128 for bonding and strength results in significantly reducing the weight of blade 110 and therefore improving engine 20 efficiency.

Additionally, by using two covers 136, 138 to enclose cavity 122, overall stress reductions on adhesive can be seen. The materials and shape for each of the two covers 136, 138 can be chosen specifically to reduce stress caused by differing coefficients of thermal expansion. The reduced thickness of each cover could also make each cover 136, 138 easier to conform to blade 62, while maintaining the needed stiffness for hollow airfoil 110 by combining covers 136, 138 to form cover 130 with a higher overall thickness.

The description above includes several example embodiments. However, several variations are possible, including in the order of steps of method 100. As described above, cavities 86, 122 are formed out of an opening in suction surface 72, 121. This is in part because the negative pressure tends to hold cover 76, 130 in place over cavities 86, 122 against a combination of one or more of socket(s) 80, 124, 126 ribs 84, and filler 87, 130. The negative pressure on suction surface 72, 121 generally maintains adhesive under a degree of compression during operation, which reduces the likelihood that bonding of cover 76, 130 weaken or fail. However, cavity 86, 122 is not limited to suction surfaces 72, 121. Other design or efficiency considerations, such as these discussed earlier, can indicate that placement of socket(s) 80, 124, 126 and cavity cover 76, 130 on pressure surface is more beneficial. In that case, the invention can easily be adapted to integrate socket(s) 80, 124, 126 of cover 76, 130 with the opposing surface.

It should also be noted that, while titanium is the benchmark material for compressor airfoils, this disclosure is not at all limited to hollow titanium or titanium alloys, nor is it necessarily limited to airfoils on turbofan engines. Several examples include airfoil as being formed from an aluminum alloy, such as one in the 7XXX series. Other lightweight alloys are also appropriate for hollow blade, provided that the finished engine 20 meets the appropriate regulations for its location and type of service. Any hollow fan, compressor, or turbine blade can be created with any suitable metallic material.

By replacing previous solid metal airfoils with a hollow cavity 86, 122 filled with foam filler 87, 128, which may be formed in place and covered with a composite cover 76, 130; airfoil 62, 110 is able to increase its stiffness to weight ratio, thereby reducing overall blade weight and increasing the efficiency of engine 20. Composite cover 76, 130 is lighterweight than a metallic cover and can be made thinner by relying on foam filler 87, 128 to reinforce its strength Using a filler 87, 128 which can be foamed in place makes blade easy to manufacture, as filler material does not need to be precisely formed and shaped prior to inserting in cavity 86, 122. Additionally, the use of two covers 136, 138, as shown in FIG. 4, can allow for easier forming as each cover is now half as thick.

While FIGS. 1-4 have shown a hollow airfoil, alternative embodiments could be any hollow article.

A hollow article includes a metallic article formed from a having a first major surface, an internal cavity with an opening in the first major surface, and a socket around the opening; a cover of composite material received in the socket and covering the opening; and a filler material of foam in the internal cavity.

Additional and/or alternative embodiments include the filler material comprising a metallic foam; the filler material comprising a non-metallic foam; the filler material comprising a pourable foam; one or more additional internal cavities between the first and second major surfaces; the cover comprising an inner composite cover; and an outer composite cover; the inner composite cover being bonded to the outer composite cover; an adhesive bond between the cover and the filler material disposed within the internal cavity; the one or more additional internal cavities being filled with filler material; all cavities being filled with one or more of: non-metallic foam and metallic foam; the cover being bonded to the hollow article with epoxy or urethane; the epoxy or urethane being scrim supported; one or more ribs within the internal cavity; the one or more ribs extending from the first major surface to the second major surface; and/or the hollow article being an airfoil.

An airfoil includes a hollow metallic airfoil structure with a suction side and a pressure side and one or more internal cavities and an opening on one of the suction side and the pressure side; a composite cover to enclose the opening; and foam material in at least one of the internal cavities.

Additional and/or alternative embodiments include each of the one or more internal cavities being filled with foam; the composite cover comprising an inner cover and an outer cover; and/or the hollow metallic airfoil structure and the filler material being adhesively bonded together.

A method for making a hollow article includes forming the hollow article from a metallic material; forming an opening, a socket, and a cavity in a first major surface of the hollow article; filling the at least one cavity with foam material; forming a composite cover sized and shaped to cover the opening; and adhesively bonding the cover to the socket and filler material.

Additional and/or alternative embodiments include the hollow article being an airfoil; the step of filling the cavity with filler material comprising injecting a foam material into the cavity; the step of forming a composite cover comprising forming a first composite cover; and forming a second composite cover; and/or bonding the first composite cover to the second composite cover.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

What is claimed is:

1. A hollow airfoil comprising:
   a metallic article having a first major surface, a second major surface, an internal cavity with an opening in the first major surface, and a first socket around the opening;
   a second socket formed in the metallic article and disposed around the first socket;
   a first cover of composite material received in the first socket and covering the opening, wherein the first cover is adhesively bonded to the metallic article;
   a second composite cover disposed in the second socket and covering the first composite composite cover, wherein the second composite cover is larger than the first composite cover and is adhesively bonded to the second socket and the first composite cover; and
   a filler material of foam in the internal cavity.

2. The hollow airfoil of claim 1, wherein the filler material comprises a metallic foam.

3. The hollow airfoil of claim 1, wherein the filler material comprises a non-metallic foam.

4. The hollow airfoil of claim 1, wherein the filler material comprises a pourable foam.

5. The hollow airfoil of claim 1, and further comprising:
   one or more additional internal cavities between the first and second major surfaces.

6. The hollow airfoil of claim 5, wherein the one or more additional internal cavities are filled with filler material.

7. The hollow airfoil of claim 6, wherein all cavities are filled with one or more of: non-metallic foam and metallic foam.

8. The hollow airfoil of claim 1, further comprising an adhesive bond between the first cover and the filler material disposed within the internal cavity.

9. The hollow airfoil of claim 1, wherein the first cover and the second cover are bonded to the hollow article with epoxy or urethane.

10. The hollow airfoil of claim 9, wherein the epoxy or urethane is scrim supported.

11. The hollow airfoil of claim 1, and further comprising:
    one or more ribs within the internal cavity.

12. The hollow airfoil of claim 11, wherein the one or more ribs extend from the first major surface to the second major surface.

13. An airfoil comprising:
    a hollow metallic airfoil structure with a suction side and a pressure side and one or more internal cavities and an opening on one of the suction side and the pressure side;
    a first socket formed in the hollow metallic airfoil around the opening;
    a second socket formed in the hollow metallic airfoil, wherein the second socket is disposed around the first socket;
    foam material disposed in at least one of the internal cavities;
    a first composite cover disposed in the first socket and covering the foam material and enclosing the opening, wherein the first cover is adhesively bonded to the first socket; and
    a second composite cover disposed in the second socket and covering the first composite cover, wherein the second composite cover is larger than the first composite cover and is adhesively bonded to the second socket and the first composite cover.

14. The airfoil of claim 13, wherein each of the one or more internal cavities is filled with foam.

15. The airfoil of claim 13, wherein the first composite cover, the hollow metallic airfoil structure and the foam material are adhesively bonded together.

16. A method for making a hollow airfoil, the method comprising:
    forming the hollow airfoil from a metallic material;
    forming an opening and at least one cavity in a first major surface of the hollow airfoil;
    forming a first socket around the opening;
    forming a second socket around the first socket;
    filling the at least one cavity with filler material;

forming a first composite cover sized and shaped to cover the opening and the first socket;

adhesively bonding the first cover to the first socket and the filler material;

forming a second composite cover sized and shaped to cover the first cover and the second socket; and adhesively bonding the second cover to the second socket and the second cover.

17. The method of claim 16, wherein the step of filling the at least one cavity with filler material comprises:

injecting a foam material into the cavity.

* * * * *